United States Patent
Park et al.

(10) Patent No.: US 8,225,393 B2
(45) Date of Patent: Jul. 17, 2012

(54) APPARATUS FOR RESTRICTING ACCESS TO APPLICATION MODULE IN MOBILE WIRELESS DEVICE AND METHOD OF RESTRICTING ACCESS TO APPLICATION MODULE USING THE SAME

(75) Inventors: Tae Joon Park, Gunpo-si (KR); Tae-Chul Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1344 days.

(21) Appl. No.: 11/506,924

(22) Filed: Aug. 21, 2006

(65) Prior Publication Data

US 2007/0232268 A1    Oct. 4, 2007

(30) Foreign Application Priority Data

Apr. 3, 2006   (KR) .................. 10-2006-0030272

(51) Int. Cl.
H04L 29/06   (2006.01)
(52) U.S. Cl. ................ 726/22; 726/2; 455/411
(58) Field of Classification Search .............. 455/411; 726/22
See application file for complete search history.

(56) References Cited

U.S. PATENT DOCUMENTS

| | | | |
|---|---|---|---|
| 6,412,070 B1 * | 6/2002 | Van Dyke et al. | 726/17 |
| 2004/0010579 A1 * | 1/2004 | Freese | 709/223 |
| 2004/0019832 A1 * | 1/2004 | Arnold et al. | 714/38 |
| 2005/0079868 A1 | 4/2005 | Shankar et al. | |
| 2005/0204127 A1 * | 9/2005 | Dive-Reclus et al. | 713/152 |
| 2006/0053426 A1 * | 3/2006 | Dive-Reclus et al. | 719/328 |

FOREIGN PATENT DOCUMENTS

| | | | |
|---|---|---|---|
| EP | 1107623 A2 * | 6/2001 | |
| EP | 1367843 A1 * | 12/2003 | |
| KR | 10-2007-0048960 | 5/2007 | |

* cited by examiner

Primary Examiner — Taghi Arani
Assistant Examiner — Narciso Victoria
(74) Attorney, Agent, or Firm — NSIP Law (57) ABSTRACT

Provided is an apparatus and a method of restricting an access to an application module of a mobile wireless device. The apparatus for restricting an access to an application module of a mobile wireless device according to an exemplary embodiment of the present invention includes an access restriction unit for receiving a request for an access to an application module from a basic module, and for restricting the access of the basic module to the application module when a restriction on the access is required. Further included is an access restriction determination unit for determining whether the restriction on the access of the basic module to the application module according to an access environment is required. Also included is an access environment determination unit for monitoring the access environment of the basic module to the application module and for providing the access restriction determination unit with a result of monitoring the access environment.

24 Claims, 5 Drawing Sheets

APPARATUS FOR RESTRICTING ACCESS TO APPLICATION MODULE IN MOBILE WIRELESS DEVICE AND METHOD OF RESTRICTING ACCESS TO APPLICATION MODULE USING THE SAME

CROSS-REFERENCE TO RELATED APPLICATION

This application claims the benefit under 35 U.S.C. § 119(a) of Korean Patent Application No. 10-2006-0030272, filed on Apr. 3, 2006, in the Korean Intellectual Property Office, the entire disclosure of which is hereby incorporated by reference.

BACKGROUND OF THE INVENTION

1. Field of the Invention

The present invention relates to a mobile wireless device. More particularly, the present invention relates to a mobile wireless apparatus and a method for restricting an access to an application module of the mobile wireless device.

2. Description of Related Art

As mobile wireless devices have become more popular, mobile wireless devices have become a basic necessity in modern society. Exemplary mobile wireless devices include a mobile phone and a personal digital assistant (PDA). Many people communicate with each other and exchange information using mobile wireless devices. For example, businessmen exchange critical business information using voice or data communications through a mobile wireless device.

Meanwhile, as mobile wireless devices have been developed and hardware specifications of the mobile wireless device have been upgraded, an operating system (OS) such as Windows or Linux is now typically installed on mobile wireless devices. Further, various OS specific software applications are typically provided in addition to the OS. Also, as functions of mobile wireless devices have been varied, a variety of application modules including hardware and software modules have been included in mobile wireless devices. Exemplary hardware modules include a Digital Multimedia Broadcasting (DMB) module and a Bluetooth module for a wireless personal area network communications. Exemplary software modules include a Multimedia Messaging System (MMS) module and a phone-book module for managing registered telephone numbers.

As hardware of mobile wireless devices has become more sophisticated, applications provided in mobile wireless devices have been varied and have become complicated. As a result, malignant code such a virus or worm is able to cause irreparable damage to mobile wireless devices. The problem of malignant code causing damage has been previously known to occur in general purpose computers.

Like general purpose computers, a mobile wireless devices are based on an OS, and a device driver is used to operate an installed hardware module. Thus, like general purpose computers, mobile wireless devices may be infected by viruses or worms and a malfunction or deletion of data may result.

Further, since mobile wireless devices are connected to each other via a wireless network, the malignant code may rapidly proliferate to other devices.

However, solutions for preventing the infection of the malignant code with respect to mobile wireless devices is considerably inferior to solutions for preventing the infection of the malignant code with respect to general purpose computers.

Also, a basic module such as the OS of the mobile wireless device or the device driver may freely access the application module, including the hardware and software modules without any restriction in the conventional art. Accordingly, malfunctioning of a particular application module, which is caused by the malignant code or abusing the predetermined application module for spreading the malignant code to other mobile wireless devices is not preventable in the conventional art.

Accordingly, there is a need for an apparatus and a method for restricting an access to an application module of a mobile wireless device that may restrict the access to the application module, such as the DMB module and the MMS module, by the basic module, such as the OS and the device driver.

SUMMARY OF THE INVENTION

Exemplary embodiments of the present invention address at least the above problems and/or disadvantages and to provide at least the advantages described below. Accordingly, an aspect of exemplary embodiments of the present invention is to provide an apparatus and a method for restricting an access to an application module of a mobile wireless device, which may effectively prevent malignant code, such as viruses or worms, from proliferating.

Exemplary embodiments of the present invention also provides an apparatus and a method for restricting an access to an application module of a mobile wireless device, which may effectively restrict a function of the mobile wireless device according to whether a user subscribes to a service by suitably restricting the access to the application module.

Exemplary embodiments of the present invention also provides an apparatus and a method for restricting an access to an application module of a mobile wireless device, which may effectively manage service models of various mobile carriers by selectively restricting the access to the application module.

According to an aspect of an exemplary embodiment of the present invention, there is provided an apparatus for restricting an access to an application module of a mobile wireless device, the apparatus including an access restriction unit for receiving a request for an access to an application module from a basic module, and for restricting the access of the basic module to the application module when a restriction on the access is required. Further included is an access restriction determination unit for determining whether the restriction on the access of the basic module to the application module according to an access environment is required. Also included is an access environment determination unit for monitoring the access environment of the basic module to the application module and for providing the access restriction determination unit with a result of the monitoring of the access environment.

In an exemplary implementation, the access environment determination unit may monitor at least one of a malignant code proliferation environment and a service subscription environment of a user. In an exemplary implementation, the access environment determination unit may include a malignant code proliferation determination unit monitoring a malignant code proliferation via at least one of the basic module and the application module or a service subscription determination unit monitoring the service subscription environment of the user with respect to the application module.

In an exemplary implementation, the access restriction determination unit determines whether the restriction on the access is required by using an access restriction list for storing information about whether an access of the basic module to at least one application module is allowed or an integrity verification unit verifying an integrity of at least one of the basic module which makes an access request to the application module, and a software which makes the access request through the basic module.

According to another aspect of an exemplary embodiment of the present invention, there is provided a method of restricting an access to an application module of a mobile wireless device, the method including monitoring an access environment of a basic module to an application module. The method further includes determining whether a restriction on an access to the application module is required according to a result of monitoring the access environment. Also the method includes restricting the access of the basic module to the application module with respect to a request for an access of the basic module to the application module, when the restriction on the access is determined to be required.

In an exemplary implementation, the access environment may include at least one of a malignant code proliferation environment and a service subscription environment of a user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will become more apparent from the following detailed description, taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
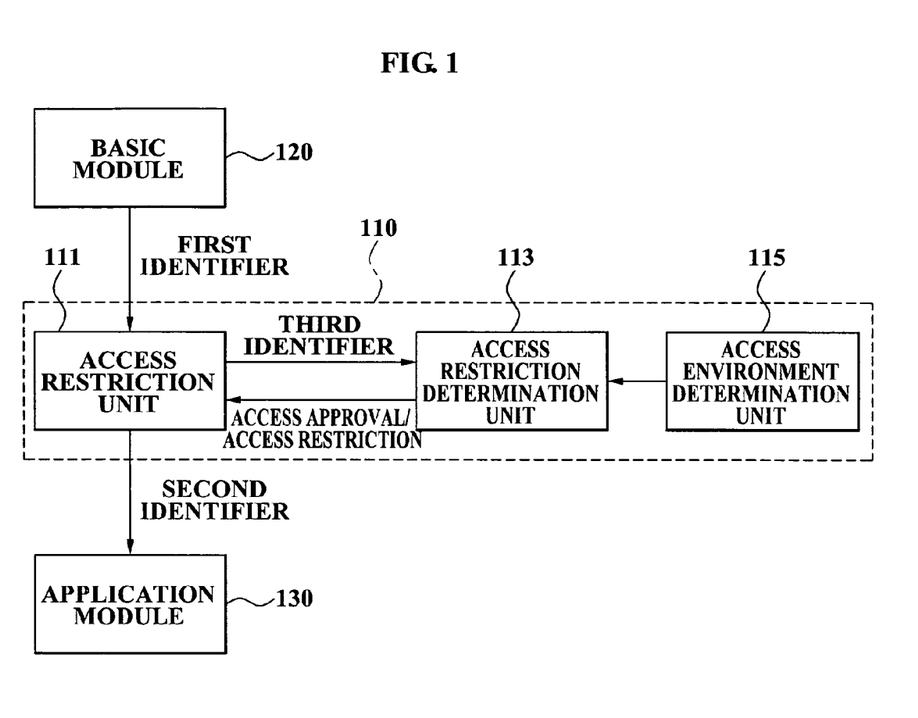
FIG. 1 is a block diagram illustrating an apparatus for restricting an access to an application module of a mobile wireless device according to an exemplary embodiment of the present invention.

FIG. 1 is a block diagram illustrating an apparatus for restricting an access to an application module 130 of a mobile wireless device 110 according to an exemplary embodiment of the present invention.

Referring to FIG. 1, the apparatus for restricting the access to the application module 130 of the mobile wireless device 110 according to an exemplary embodiment of the present invention includes an access restriction unit 111, an access restriction determination unit 113, and an access environment determination unit 115.

The access restriction unit 111 receives a request for the access to the application module 130 from a basic module 120 and restricts the access of the basic module 120 to the application module 130 when a restriction on the access is required.

In an exemplary implementation, the basic module 120 may refer to an operating system (OS), a device driver, etc.

In an exemplary implementation, the application module 130 may refer to a hardware module such as a Bluetooth module or a Digital Multimedia Broadcasting (DMB) module, or a software module such as a Multimedia Messaging System (MMS) module and a phone-book module. Namely, the application module 130 may include various kinds of hardware and/or software modules which perform various additional functions in the mobile wireless device 110 based on the basic module 120.

The application module 130 is accessed by the basic module 120, may perform additional functions in the mobile wireless device 110, and may be interoperated with other application modules.

According to exemplary embodiments, the access restriction unit 111 may receive a first identifier, with respect to the application module 130 to which the basic module tries to access, from the basic module 120. Further, the access restriction unit 111 may provide a second identifier capable of accessing the application module 130 only when the restriction on the access is not required. Namely, when the restriction on the access is required, the access restriction unit 111 does not provide a valid second identifier. Accordingly, the basic module 120 may not access the corresponding application module 130.

The access restriction determination unit 113 determines whether the restriction on the access of the basic module 120 to the application module 130 is required, according to an access environment.

In an exemplary implementation, the access environment may refer to a malignant code proliferation environment and a service subscription environment of a user. In an exemplary implementation, the malignant code proliferation environment may include information about whether a malignant code proliferates via at least one of the basic module 120 and the application module 130. In an exemplary implementation, the service subscription environment may include information about whether the user subscribes to a service with respect to the application module 130.

In an exemplary implementation, access restriction determination unit 113 may receive a third identifier from the access restriction unit 111. The third identifier may be user information corresponding to a request for access. Further, the access restriction determination unit 113 may provide an indication of access approval or access restriction to the access restriction unit 111.

In an exemplary implementation, the access restriction determination unit 113 may receive user information corresponding to a request for the access, and determine whether the restriction on the access is required according to the user information. Accordingly, the restriction on the access to the application module 130, which is optimized according to the user, may be performed by determining whether the restriction on the access is required according to the user information.

The access restriction determination unit 113 may determine whether the restriction on the access is required by using at least any one of an access restriction list storing information about whether an access of the basic module to at least one application module 130 is allowed, an integrity verification unit verifying an integrity of at least one of the basic module which makes an access request to the application module 130, and software which makes the access request through the basic module.

The access environment determination unit 115 monitors the access environment of the basic module to the application module 130 and provides the access restriction determination unit 113 with a result of the monitoring of the access environment.

As an example, the access environment determination unit 115 may determine whether a proliferation of the malignant code is confirmed or suspected. The access environment determination unit 115 may control the access restriction determination unit 113 based on a result of the determination.

As an example, the access environment determination unit 115 may determine whether the user subscribes to the service corresponding to the application module 130. The access environment determination unit 115 may control the access restriction determination unit 113 based on a result of the determination.

According to exemplary embodiments, the apparatus for restricting the access to the application module 130 of the mobile wireless device 110 illustrated in FIG. 1 may be protected by temper-resistant hardware.

Figure 2:
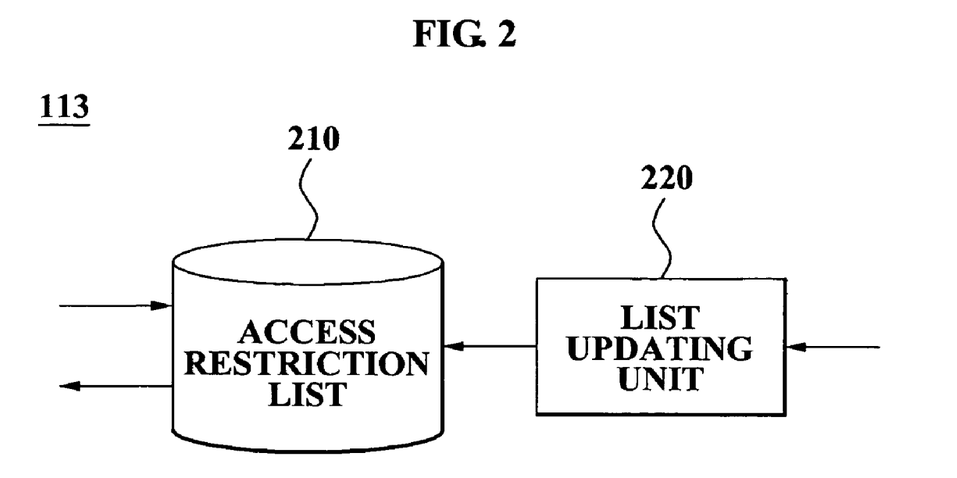
FIG. 2 is a block diagram illustrating an example of an access restriction determination unit illustrated in FIG. 1.

FIG. 2 is a block diagram illustrating an example of an access restriction determination unit 113 illustrated in FIG. 1.

Referring to FIG. 2, the access restriction determination unit 113 includes an access restriction list 210 and a list updating unit 220.

The access restriction list 210 stores information about whether an access of a basic module 120 with respect to at least one application module 130 is allowed.

According to exemplary embodiments, whether the access of the basic module 120 with respect to at least one application module 130 is allowed may be stored according to a user in the access restriction list 210. In an exemplary implementation, the access restriction determination unit 113 may determine whether the access is allowed according to the user. As an example, when a user A tries to access a DMB module, the access restriction determination unit 113 may permit the access. When a user B tries to access to the DMB module, the access restriction determination unit 113 may not permit the access.

The list updating unit 220 updates the access restriction list 210 according to the access environment.

As an example, when the access environment is determined to be an environment in which a malignant code has proliferated through an MMS module, the list updating unit may update the access restriction list 210 to control the access of the basic module 120 to the MMS module.

As an example, when the access environment is determined to be an environment such as a user subscription to the DMB service, the list updating unit may update the access restriction list 210 to permit the access of the basic module 120 to the DMB module which was restricted.

Figure 3:
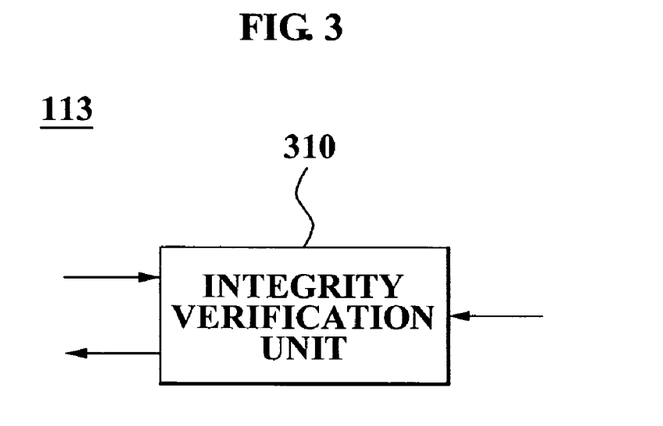
FIG. 3 is a block diagram illustrating another example of an access restriction determination unit illustrated in FIG. 1.

FIG. 3 is a block diagram illustrating another example of an access restriction determination unit 113 illustrated in FIG. 1.

Referring to FIG. 3, the access restriction determination unit 113 includes an integrity verification unit 310.

The integrity verification unit 310 verifies an integrity of at least one of the basic module 120 which makes an access request to the application module 130, and software which makes the access request through the basic module 120.

Specifically, the integrity verification unit 310 may verify the integrity of the basic module 120 which makes the access request to the application module 130, and the integrity of the software which makes the access request through the basic module 120. Also, the integrity verification unit 310 may verify the integrity of the basic module 120 and the software which makes the access request through the basic module 120.

As an example, the integrity verification unit 310 may verify the integrity of the basic module 120 or the software which makes the access request through the basic module 120 by using a checksum calculation method with respect to a program code and a memory region.

In an exemplary implementation, not shown in FIGS. 1 and 3, the integrity verification unit 310 may communicate with the basic module 120 in order to verify the integrity of the basic module 120 or the software which makes the access request through the basic module 120.

In an exemplary implementation, the integrity verification unit 310 may verify the integrity in response to a request from at least one of the access restriction unit 111 and the access environment determination unit 115 which are illustrated in FIG. 1.

In an exemplary implementation, a determination whether the restriction on the access is required according to an integrity verification may be performed differently depending upon the user.

Figure 4:
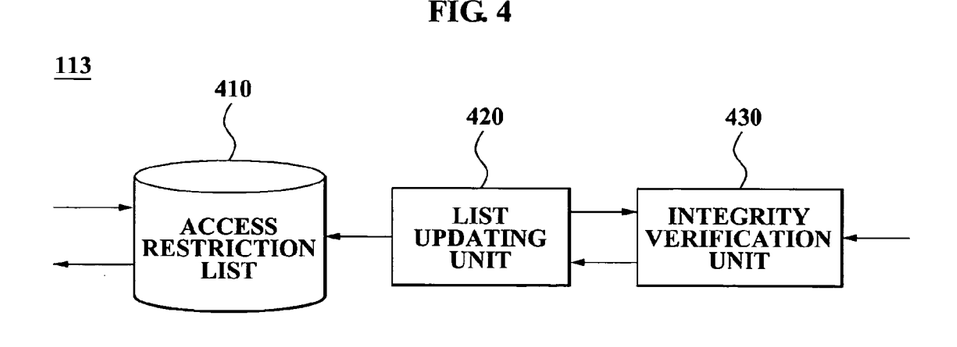
FIG. 4 is a block diagram illustrating still another example of an access restriction determination unit illustrated in FIG. 1.

FIG. 4 is a block diagram illustrating still another example of an access restriction determination unit 113 illustrated in FIG. 1.

Referring to FIG. 4, the access restriction determination unit 113 includes an access restriction list 410, a list updating unit 420, and an integrity verification unit 430.

The access restriction list 410 stores information about whether an access of a basic module 120 with respect to at least one application module 130 is allowed.

The list updating unit 420 updates the access restriction list 410 according to a result of a verification of the integrity verification unit 430. According to exemplary embodiments, the list updating unit 420 may periodically request the integrity verification unit 430 to verify an integrity.

The integrity verification unit 430 verifies the integrity of at least one of the basic module 120 which makes an access request to an application module 130, and software which makes the access request through the basic module 120.

As an example, the integrity verification unit 430 may verify the integrity of the basic module 120 or the software which makes the access request through the basic module 120 by using a checksum calculation method with respect to a program code and a memory region.

In an exemplary implementation, the integrity verification unit 430 may verify the integrity in response to a request from a list updating unit 420 or an access environment determination unit 115 which is illustrated in FIG. 1.

In an exemplary implementation, not shown in FIGS. 1 and 4, the integrity verification unit 430 may communicate with the basic module 120 in order to verify the integrity of the basic module 120 or the software which makes the access request through the basic module 120.

The access restriction list 210 and access restriction list 410 which are illustrated in FIGS. 2 and 4 respectively may be updated by at least one of mobile carriers, users, and mobile wireless devices.

Figure 5:
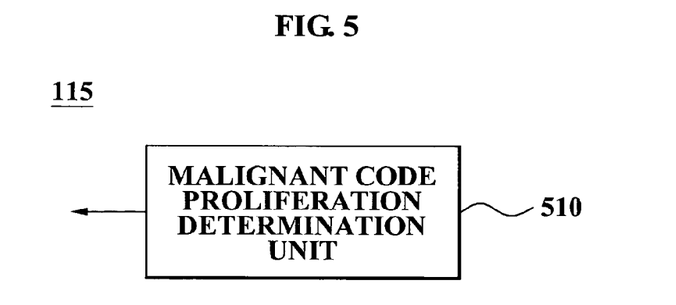
FIG. 5 is a block diagram illustrating an example of an access environment determination unit illustrated in FIG. 1.

FIG. 5 is a block diagram illustrating an example of an access environment determination unit 115 illustrated in FIG. 1.

Referring to FIG. 5, the access environment determination unit 115 includes a malignant code proliferation determination unit 510.

The malignant code proliferation determination unit 510 monitors a malignant code proliferation via at least one of a basic module 120 and an application module 130.

In an exemplary implementation, the malignant code proliferation determination unit 510 may determine whether a proliferation of the malignant code is confirmed or suspected. The malignant code proliferation determination unit 510 may control the access restriction determination unit 113 which is illustrated in FIG. 1 based on a result of the determination.

In an exemplary implementation, the malignant code proliferation determination unit 510 may be updated by at least one of mobile carriers, users, and mobile wireless devices.

In an exemplary implementation, the malignant code proliferation determination unit 510 may determine, by using various methods such as an anti-virus technology and an intrusion detection technology, whether the malignant code proliferates.

Figure 6:
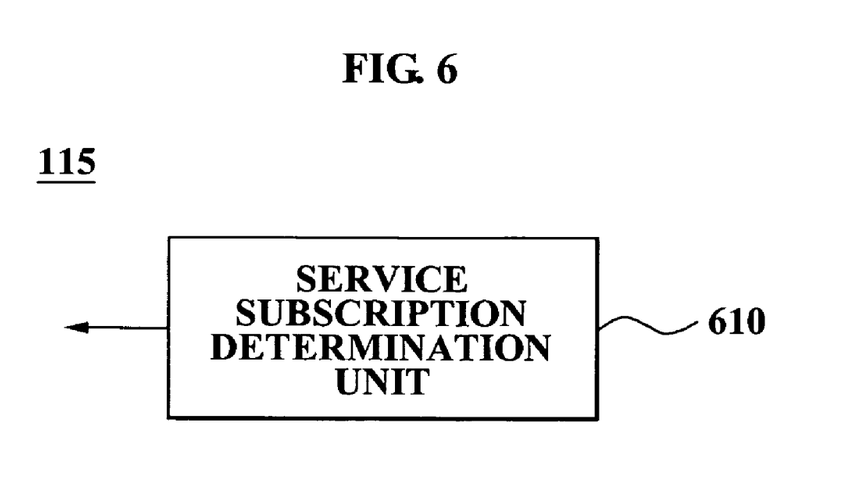
FIG. 6 is a block diagram illustrating another example of an access environment determination unit illustrated in FIG. 1.

FIG. 6 is a block diagram illustrating another example of an access environment determination unit 115 illustrated in FIG. 1.

Referring to FIG. 6, the access environment determination unit 115 includes a service subscription determination unit 610.

The service subscription determination unit 610 monitors a service subscription environment of a user with respect to an application module 130.

As an example, the service subscription determination unit 610 may check whether the user, who has not previously subscribed to a DMB service, has newly subscribed to the DMB service. When the service subscription determination unit 610 determines that the user who did not previously subscribe to the DMB service subscribes to the DMB service, the service subscription determination unit 610 may control the access environment determination unit 115 illustrated in FIG. 1 so that the access to the DMB module with respect to the user is not restricted.

Also, the service subscription determination unit 610 may check whether the user, who has previously subscribed to the DMB service, has newly canceled the DMB service. When the service subscription determination unit 610 determines that the user who has previously subscribed the DMB service cancels the DMB service, the service subscription determination unit 610 may control the access environment determination unit 115 so that the access to the DMB module with respect to the user is restricted.

Figure 7:
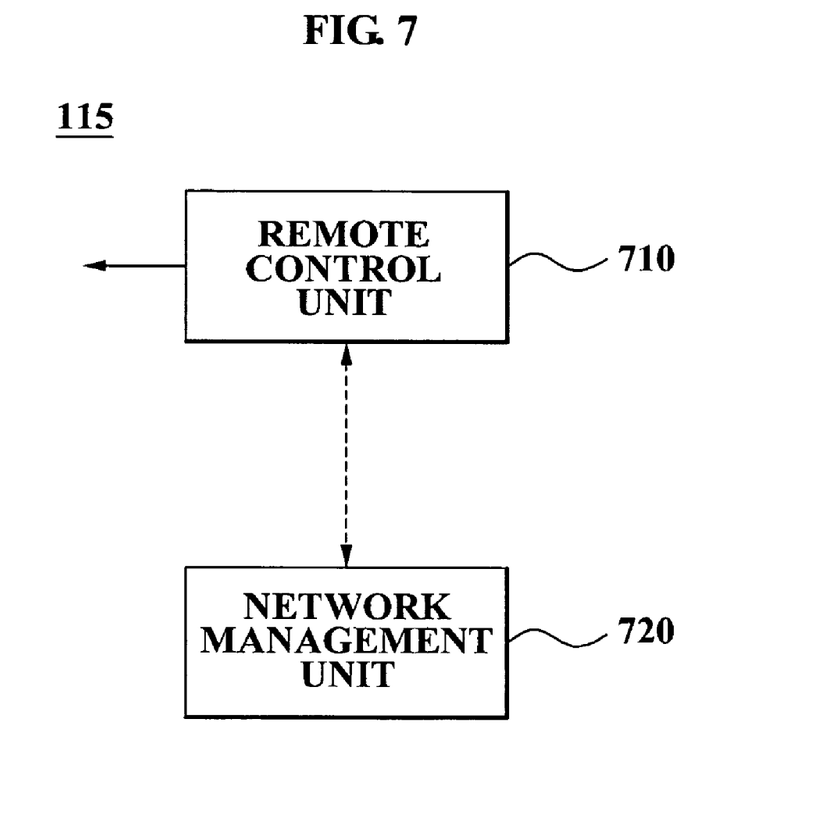
FIG. 7 is a block diagram illustrating still another example of an access environment determination unit illustrated in FIG. 1.

FIG. 7 is a block diagram illustrating still another example of an access environment determination unit 115 illustrated in FIG. 1.

Referring to FIG. 7, the access environment determination unit 115 includes a remote control unit 710.

The remote control unit 710 authenticates a network management unit 720 by wirelessly communicating with the network management unit 720, and controls the network management unit 720 to remotely control the access restriction determination unit 113 illustrated in FIG. 1.

In an exemplary implementation, the remote control unit 710 may wirelessly communicate with the network management unit 720, control a list updating unit 210 or 410 illustrated in FIGS. 2 and 4, and suitably control the list updating unit 210 or 410 to update an access restriction list.

The network management unit 720 may control an apparatus for restricting an access to an application module 130 of a mobile wireless device 110 so that an access restriction list is suitably updated through a radio frequency (RF) interface or a wireless link in a remote location. In an exemplary implementation, the network management unit 720 may control an integrity verification unit 310 or 430 illustrated in FIGS. 3 and 4 to verify an integrity.

In an exemplary implementation, the network management unit 720 and the remote control unit 710 may perform a reciprocal authentication for security. Namely, the apparatus for restricting the access to the application module 130 of the mobile wireless device 110 may be protected, by performing the reciprocal authentication, from an attack of an attacker which masquerades as the network management unit 720.

Figure 8:
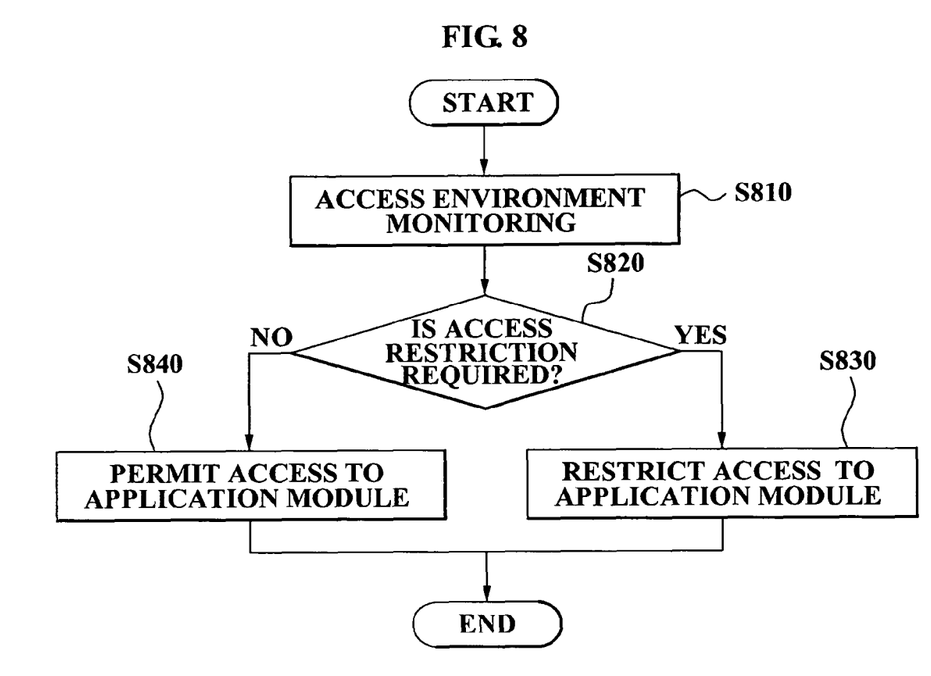
FIG. 8 is a flowchart illustrating a method of restricting an access to an application module of a mobile wireless device according to an exemplary embodiment of the present invention.

FIG. 8 is a flowchart illustrating a method of restricting an access to an application module 130 of a mobile wireless device 110 according to an exemplary embodiment of the present invention.

Referring to FIG. 8, in operation S810, the method of restricting the access to the application module 130 of the mobile wireless device 110 monitors an access environment of a basic module 120 to an application module 130.

In an exemplary implementation, the access environment may refer to a malignant code proliferation environment and a service subscription environment of a user. In an exemplary implementation, the malignant code proliferation environment may include information about whether a malignant code proliferates via at least one of the basic module 120, and the application module 130. In an exemplary implementation, the service subscription environment may include information about whether the user subscribes to a service with respect to the application module 130.

In an exemplary implementation, in operation S810, a network management unit 720 is authenticated by wirelessly communicating with the network management unit 720 in a remote location. Also, in operation S810, information about the access environment is provided from the authenticated network management unit 720.

Also, in operation S820, the method of restricting the access to the application module 130 of the mobile wireless device 110 may determine whether a restriction on the access of the basic module 120 to the application module 130 is required according to a result of monitoring the access environment.

According to exemplary embodiments, in operation S820, whether the restriction on the access is required may be determined by using an access restriction list 210 or 410 storing information about whether an access of the basic module 120 to at least one application module 130 is allowed. In an exemplary implementation, the access restriction list 210 or 410 may be updated according to the access environment.

According to exemplary embodiments, in operation S820, an integrity of at least one of the basic module 120 which makes the access request to the application module 130, and software which makes the access request through the basic module 120 may be verified, and whether the restriction on the access is required may be determined according to a result of a verification of the integrity verification unit 310 or 430.

According to exemplary embodiments, in operation S820, whether the restriction on the access is required may be determined by using the access restriction list storing information about whether the access of the basic module 120 to at least one application module 130 is allowed. The access restriction list may be updated according to the result of verifying the integrity of at least one of the basic module 120 which makes the access request to the application module 130, and the software which makes the access request through the basic module 120.

In an exemplary implementation, in operation S820, user information corresponding to the request for the access may be received, and whether the restriction on the access is required may be determined according to the user information.

As a result of the determination in operation S820, in operation S830, when the restriction on the access is determined to be required, the method of restricting the access to the application module 130 of the mobile wireless device 110 restricts the access of the basic module 120 to the application module 130.

In an exemplary implementation, in operation S830, the access to the application module 130 may be restricted by receiving a first identifier with respect to the application module 130 to which the basic module 120 tries to access from the basic module 120, and providing a second identifier capable of accessing the application module 130 only when the restriction on the access is not required.

As a result of the determination in operation S830, in operation S840, when the restriction on the access is determined to be not required, the method of restricting the access to the application module 130 of the mobile wireless device 110 permits the access of the basic module 120 to the application module 130.

An embodiment which is not described in association with the method which is described with reference to FIG. 8 may be applicable to an exemplary embodiment with respect to an apparatus of restricting the access to the application module 130 of the mobile wireless device 110. Accordingly, the description will not be described in this specification.

The data collecting method according to the above-described exemplary embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the exemplary embodiments of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

An apparatus and a method for restricting an access to an application module 130 of a mobile wireless device 110 according to an exemplary embodiment of the present invention may effectively prevent a malignant code, such as viruses or worms, from proliferating by suitably restricting the access to the application module 130 of the mobile wireless device 110.

Also, an apparatus and a method for restricting an access to an application module 130 of a mobile wireless device 110 according to an exemplary embodiment of the present invention may effectively restrict a function of the mobile wireless device 110 according to a service subscription by suitably restricting the access to the application module 130.

Also, an apparatus and a method for restricting an access to an application module 130 of a mobile wireless device 110 according to an exemplary embodiment of the present invention may effectively manage service models of various mobile carriers by selectively restricting the access to the application module 130.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for restricting an access to an application module of a mobile wireless device, the mobile wireless device usable by a plurality of users, the apparatus comprising:
    an access restriction unit configured to:
        receive a request for an access to an application module from a basic module; and
        restrict the access of the basic module to the application module in response to a restriction on the access being required;
    an access restriction determination unit configured to determine whether the restriction on the access of the basic module to the application module is required based on an access environment, the access environment comprising information about whether a current user of the mobile wireless device subscribes to a service with respect to the application module; and
    an access environment determination unit configured to:
        monitor the access environment of the basic module to the application module; and
        provide the access restriction determination unit with a result of the monitoring of the access environment;
    wherein the access restriction determination unit comprises:
        an access restriction list configured to store information about whether the access of the basic module to at least one application module is allowed;
        a list updating unit configured to update the access restriction list; and
        an integrity verification unit configured to verify an integrity of at least one of:
            the basic module configured to make an access request to the application module; and
            software configured to make the access request through the basic module; and
    the list updating unit is further configured to update the access restriction list according to a result of a verification of the integrity verification unit.

2. The apparatus of claim 1, wherein the access environment determination unit is further configured to monitor at least one of a malignant code proliferation environment and a service subscription environment of the current user.

3. The apparatus of claim 2, wherein the access environment determination unit comprises a malignant code proliferation determination unit configured to monitor a malignant code proliferation via at least one of the basic module and the application module.

4. The apparatus of claim 2, wherein the access environment determination unit comprises a service subscription determination unit configured to monitor whether the current user of the mobile wireless device subscribes to the service with respect to the application module.

5. The apparatus of claim 2, wherein the access environment determination unit comprises a remote control unit configured to:
 authenticate a network management unit by wirelessly communicating with the network management unit in a remote location; and
 control the network management unit to remotely control the access restriction determination unit.

6. The apparatus of claim 1, wherein the access restriction unit is further configured to:
 receive a first identifier with respect to the application module attempting to be accessed by the basic module; and
 provide a second identifier capable of accessing the application module only in response to the restriction on the access being not required.

7. The apparatus of claim 1, wherein the access restriction determination unit comprises:
 an access restriction list configured to store information about whether an access of the basic module to at least one application module is allowed; and
 a list updating unit configured to update the access restriction list according to the access environment.

8. The apparatus of claim 1, wherein the access restriction determination unit comprises an integrity verification unit configured to verify an integrity of at least one of:
 the basic module configured to make an access request to the application module; and
 software configured to make the access request through the basic module.

9. The apparatus of claim 8, wherein the integrity verification unit is further configured to verify the integrity in response to a request from at least one of the access restriction unit and the access environment determination unit.

10. The apparatus of claim 1, wherein the integrity verification unit is further configured to verify the integrity in response to the request from at least one of the list updating unit and the access environment determination unit.

11. The apparatus of claim 1, wherein the access restriction determination unit is further configured to:
 receive user information related to the current user, corresponding to the request for the access; and
 determine whether the restriction on the access is required according to the user information.

12. The apparatus of claim 1, wherein the apparatus for restricting the access to the application module of the mobile wireless device is protected by a tamper-resistant hardware.

13. A method of restricting an access to an application module of a mobile wireless device, the mobile wireless device usable by a plurality of users, the method comprising:
 monitoring an access environment of a basic module to an application module;
 determining, by an access restriction determination unit, whether a restriction on an access of the basic module to the application module is required according to a result of monitoring the access environment, the access environment comprising information about whether a current user of the mobile wireless device subscribes to a service with respect to the application module; and
 restricting the access of the basic module to the application module with respect to a request for an access of the basic module to the application module, in response to the restriction on the access being determined to be required;
 wherein the access restriction determination unit comprises:
 an access restriction list configured to store information about whether the access of the basic module to at least one application module is allowed;
 a list updating unit configured to update the access restriction list; and
 an integrity verification unit configured to verify an integrity of at least one of:
 the basic module configured to make an access request to the application module; and
 software configured to make the access request through the basic module; and
 the list updating unit is further configured to update the access restriction list according to a result of a verification of the integrity verification unit.

14. The method of claim 13, wherein the access environment comprises at least one of a malignant code proliferation environment and a service subscription environment of the current user.

15. The method of claim 14, wherein the malignant code proliferation environment comprises information about whether a malignant code proliferates via at least one of the basic module and the application module.

16. The method of claim 14, wherein the service subscription environment comprises information about whether the current user of the mobile wireless device subscribes to the service with respect to the application module.

17. The method of claim 14, wherein the monitoring of the access environment comprises:
 authenticating a network management unit by wirelessly communicating with the network management unit in a remote location; and
 being provided information about the access environment from the authenticated network management unit.

18. The method of claim 13, wherein the restricting of the access of the basic module comprises:
 receiving a first identifier with respect to the application module attempting to be accessed by the basic module; and
 providing a second identifier capable of accessing the application module only in response to the restriction on the access being not required.

19. The method of claim 13, wherein the determining of the restriction on the access comprises determining whether the restriction on the access is required by using an access restriction list storing information about whether an access of the basic module to at least one application module is allowed, the access restriction list being updated according to the access environment.

20. The method of claim 13, wherein the determining of the restriction on the access comprises:
 verifying an integrity of at least one of:
 the basic module which makes the access request to the application module; and
 software which makes the access request through the basic module; and
 determining whether the restriction on the access is required according to a result of the verification.

21. The method of claim 13, wherein the determining of the restriction on the access comprises determining whether the restriction on the access is required by using an access restriction list for storing information about whether the access of the basic module to at least one application module is allowed, the access restriction list being updated according to a result of verifying the integrity of at least one of:

the basic module which makes the access request to the application module; and     the software which makes the access request through the basic module.

22. The method of claim 13, wherein the determining of the restriction on the access:

utilizes user information related to the current user, corresponding to the request for the access; and     determines whether the restriction on the access is required according to the user information.

23. A non-transitory computer-readable recording medium storing a program for implementing the method of restricting an access to an application module of a mobile wireless device, the mobile wireless device usable by a plurality of users, the method comprising:

monitoring an access environment of a basic module to an application module;

determining, by an access restriction determination unit, whether a restriction on an access to the application module of the basic module is required according to a result of monitoring the access environment, the access environment comprising information about whether a current user of the mobile wireless device subscribes to a service with respect to the application module; and     restricting the access to the application module of the basic module with respect to a request for an access to the application module of the basic module, in response to the restriction on the access being determined to be required;

wherein the access restriction determination unit comprises:

an access restriction list configured to store information about whether the access of the basic module to at least one application module is allowed;

a list updating unit configured to update the access restriction list; and         an integrity verification unit configured to verify an integrity of at least one of:

the basic module configured to make an access request to the application module; and             software configured to make the access request through the basic module; and     the list updating unit is further configured to update the access restriction list according to a result of a verification of the integrity verification unit.

24. An apparatus for restricting an access to an application module of a mobile wireless device, the mobile device usable by a plurality of users, the apparatus comprising:

a means for receiving a request for an access to an application module from a basic module, and restricting the access of the basic module to the application module in response to a restriction on the access being required;

a means for determining whether the restriction on the access of the basic module to the application module is required, according to a result of a monitoring of an access environment, the access environment comprising information about whether a current user of the mobile wireless device subscribes to a service with respect to the application module; and     a means for monitoring the access environment of the basic module to the application module and for generating the result of the monitoring of the access environment;

wherein the means for determining whether the restriction on the access of the basic module to the application module is required comprises:

an access restriction list configured to store information about whether the access of the basic module to at least one application module is allowed;

a list updating unit configured to update the access restriction list; and         an integrity verification unit configured to verify an integrity of at least one of:

the basic module configured to make an access request to the application module; and             software configured to make the access request through the basic module; and     the list updating unit is further configured to update the access restriction list according to a result of a verification of the integrity verification unit.

\* \* \* \* \*